United States Patent
Bendixen et al.

(10) Patent No.: US 10,816,002 B2
(45) Date of Patent: Oct. 27, 2020

(54) HIGH TEMPERATURE PUMP UNIT WITH MAGNETIC COUPLING

(71) Applicant: Grundfos Holding A/S, Bjerringbro (DK)

(72) Inventors: Flemming Buus Bendixen, Hobro (DK); Alan Ivo Sogaard Sorensen, Hobro (DK)

(73) Assignee: Grundfos Holding A/S, Bjerringbro (DK)

( * ) Notice: Subject to any disclaimer, the term of this patent is extended or adjusted under 35 U.S.C. 154(b) by 206 days.

(21) Appl. No.: 15/776,130

(22) PCT Filed: Nov. 16, 2016

(86) PCT No.: PCT/EP2016/077841
§ 371 (c)(1),
(2) Date: May 15, 2018

(87) PCT Pub. No.: WO2017/085114
PCT Pub. Date: May 26, 2017

(65) Prior Publication Data
US 2018/0320691 A1    Nov. 8, 2018

(30) Foreign Application Priority Data
Nov. 16, 2015  (EP) .................................. 15194733

(51) Int. Cl.
*F04D 13/02*  (2006.01)
*F04D 7/06*  (2006.01)
(Continued)

(52) U.S. Cl.
CPC ............. *F04D 13/027* (2013.01); *F04D 7/06* (2013.01); *F04D 13/06* (2013.01); *H02K 49/106* (2013.01); *H02K 2201/06* (2013.01)

(58) Field of Classification Search
CPC ............ F04D 13/07; F04D 7/06; F04D 13/06; H02K 49/106; H02K 2201/06
(Continued)

(56) References Cited

U.S. PATENT DOCUMENTS 2,436,939 A    3/1948  Schug
6,841,910 B2 *  1/2005  Gery .................... H02K 49/106
                                                        310/103
(Continued)

FOREIGN PATENT DOCUMENTS

DE    29716110 U1    2/1999
EP    2063139 A1    5/2009
(Continued)

OTHER PUBLICATIONS

English Translation of WO2013157985A1 (Year: 2020).*
(Continued)

*Primary Examiner* — Connor J Tremarche
(74) *Attorney, Agent, or Firm* — Taft Stettinius & Hollister LLP

(57) ABSTRACT

The present invention relates to a pump unit (300), with at least one impeller, comprising a coupling, wherein the coupling is mechanically connected to the at least one impeller via an inner rotor and where an outer rotor is connected to an electrical machine arranged to produce a rotational torque, said pump being arranged to circulate a hot fluid by the impeller. The coupling includes an outer rotor including a plurality of permanent magnets (101,201) arranged to form a plurality of magnetic poles (105, 205), and an inner rotor (110, 210), whereby the outer rotor and the inner rotor are located coaxially to one another around an axis (130, 230) and spaced apart from one another by an air gap (150,250). A rotor can (330) is arranged in the air gap (250, 150) between the inner rotor and the outer rotor, so as
(Continued)

to make a dividing section between the inner and outer rotor. Each of the plurality of magnetic poles comprises at least a section with a radial magnetic direction in respect of the axis (130, 230) and at least a section with a magnetic direction angled between a radial direction and a tangential direction in respect of the axis (130, 230), wherein the combined length of the sides of the plurality of permanent magnets cover less than 75% of the circumference of the cylindrical structure. The outer rotor has a cylindrical structure (120, 220) surrounding the plurality of magnetic poles (105, 205), and the cylindrical structure is made of a magnetic susceptible material for conducting a magnetic flux between the plurality of magnetic poles (105, 205) The inner rotor (110, 210) is made of a magnetic susceptible material and free from permanent magnetic material, wherein the inner rotor is formed with multiple radial projections (111, 211) acting as salient inner rotor poles distributed around the axis (130, 230) of the inner rotor. The invention also relates to a coupling with the above mentioned coupling features.

19 Claims, 9 Drawing Sheets

(51) Int. Cl.
*F04D 13/06* (2006.01)
*H02K 49/10* (2006.01)

(58) Field of Classification Search
USPC ........................................................ 417/420
See application file for complete search history.

(56) References Cited

U.S. PATENT DOCUMENTS

| | | | |
|---|---|---|---|
| 7,741,746 B2 | 6/2010 | Groening | |
| 7,832,922 B2* | 11/2010 | Schoeb | B01F 7/00716 |
| | | | 366/273 |
| 2005/0253476 A1* | 11/2005 | Zhong | H02K 1/08 |
| | | | 310/216.064 |
| 2006/0144387 A1* | 7/2006 | Sato | F04D 25/026 |
| | | | 126/110 R |
| 2006/0197396 A1* | 9/2006 | Pollock | H02P 6/182 |
| | | | 310/166 |
| 2008/0238234 A1* | 10/2008 | Saban | H02K 1/278 |
| | | | 310/156.28 |
| 2012/0217833 A1* | 8/2012 | Sakai | H02K 21/04 |
| | | | 310/156.01 |
| 2013/0049511 A1* | 2/2013 | Nishimura | H02K 1/278 |
| | | | 310/156.28 |

FOREIGN PATENT DOCUMENTS

| | | |
|---|---|---|
| FR | 1308550 A | 11/1962 |
| WO | 2013157985 A1 | 10/2013 |
| WO | WO-2013157985 A1 * 10/2013 | ........... F04D 13/024 |

OTHER PUBLICATIONS

International Search Report; European Patent Office; International Application No. PCT/EP2016/077841; dated Feb. 7, 2017; 4 pages.
Written Opinion of the International Searching Authority; European Patent Office; International Application No. PCT/EP2016/077841; dated Feb. 7, 2017; 6 pages.
International Preliminary Report on Patentability; The International Bureau of WIPO; International Application No. PCT/EP2016/077841; dated May 22, 2018; 7 pages.

\* cited by examiner

HIGH TEMPERATURE PUMP UNIT WITH MAGNETIC COUPLING

CROSS-REFERENCE TO RELATED APPLICATIONS

This application is a U.S. National Phase of International PCT Application No. PCT/EP2016/077841 filed Nov. 16, 2016, which claims priority to European Patent Application No. 15194733.0 filed Nov. 16, 2015, each of which are incorporated herein by reference in their entirety.

FIELD OF THE INVENTION

The invention relates to a centrifugal pump unit with a magnetic coupling and its use in conjunction with high temperature applications.

BACKGROUND OF THE INVENTION

Mechanical couplings have been used and known for a long period. Such couplings or connectors are arranged to join two shafts so they can rotate together. Magnetic couplings are also known and such couplings are made with an inner and an outer rotor, where both rotor have permanent magnets attached in a configuration so magnetic forces ensure the coupling between the two rotors. Magnetic couplings can also be used as torque limiters as the coupling will slip when the rotational torque exceeds the magnetic torque between the inner and the outer rotor.

The prior art comprises U.S. Pat. No. 6,841,910 B2 which discloses a magnetic coupling having two opposed annular arrays of angularly spaced permanent magnets magnetized to create magnetic north poles and magnetic south poles alternately spaced about each array. The north-pole and south-pole magnets of each array are tapered in cross-section from their surfaces at the gap to an annular surface of the array spaced from the gap, and permanent magnet spacer magnets completely fill in the space between the north-pole and south-pole magnets from the annular surface of the array at the gap to the spaced annular surface with the spacer magnets being magnetized generally transversely to the direction of magnetization of the adjacent north-pole, south-pole magnets so that the magnetic field created by the permanent magnets extends across the gap and annularly through each array to cause one of the arrays to rotate in synchronism with the other array.

From EP2063139B1 it is well known to have an electric motor which, via a shaft drives an outer rotor, designed as a hollow cylinder, and within which an inner rotor is placed. The inner rotor rotates as a result of magnets disposed on the outer rotor, when the outer rotor is being rotated. A rotor can separates the outer rotor from the inner rotor.

A problem of the prior art is that in a high temperature application where liquids of high temperature are pumped, the high temperature can demagnetize the permanent magnetic material of the rotor. To avoid this the temperature of the liquid to be pumped has to be lowered, or the rotor with permanent magnets has to be cooled. Cooling arrangements are cumbersome and costly, and if they fail the pump will also fail due to demagnetization of the magnets in the rotor.

It is an object of the present invention to provide a magnetic coupling for use in a centrifugal pump unit which coupling can operate together with high temperature fluids, where the temperature of the fluid exceeds 350 degrees Celsius.

It is thus an object of the present invention to increase the working temperature range of a pump unit.

SUMMARY

One aspect of the present disclosure is a pump unit with at least one impeller, where the pump comprises a magnetic coupling, wherein the coupling is mechanically connected to the at least one impeller via an inner rotor and where an outer rotor is connected to a machine such as an electric motor arranged to produce a rotational torque, said pump being arranged to circulate a fluid by the impeller, the coupling comprising an outer rotor including a plurality of permanent magnets arranged to form a plurality of magnetic poles;

an inner rotor;

the outer rotor and the inner rotor being located coaxially to one another around an axis and spaced apart from one another by an air gap;

a rotor can arranged in the air gap, between the inner rotor and the outer rotor, so to make a dividing section between the inner and outer rotor;

each of the plurality of magnetic poles, comprising at least a section with a radial magnetic direction in respect of the axis and at least a section with a magnetic direction angled between a radial direction and a tangential direction in respect of the axis;

the outer rotor has a cylindrical structure surrounding the plurality of magnetic poles, the cylindrical structure being made of a magnetic susceptible material for conducting a magnetic flux between the plurality of magnetic poles;

the inner rotor being made of a magnetic susceptible material and free of permanent magnetic material, wherein the inner rotor is formed with multiple radial projections acting as salient inner rotor poles distributed around the axis of the inner rotor; and wherein the combined length of the sides of the plurality of permanent magnets cover less than 75% of the circumference of the cylindrical structure. The pump unit according to claim 1, wherein at least some of the plurality of permanent magnets (101,102,104) are covered fully or partly with a thermal protection layer.

One aspect of the present invention is that the inner rotor is made without additional permanent magnetic material and thus can operate at higher temperatures compared to pumps with permanent magnetic material in the inner rotor. The inner rotor is free from permanent magnetic material i.e. the rotor does not comprise extra or additional permanent magnetic material added to the rotor core, which consists of magnetic susceptible material. Magnetic susceptible material is soft magnetic material. The rotor according to the invention does not have permanent magnets mounted on the rotor surface or embedded inside the rotor. In its simplest version the magnetic susceptible material of the rotor is iron which is soft magnetic and magnetizable, but not permanently magnetic. By avoiding placing of permanent magnets inside or close to the high temperature liquid environment of the inner rotor demagnetization or de-rating of the magnets is prevented.

Another advantage of the present invention is the salient poles arrangement of the inner rotor combined with the magnetic design of the outer rotor, where the cylindrical structure surrounding the plurality of magnetic poles conduct magnetic flux between the magnetic poles. This increases advantageously the magnetic torque transferred in the coupling compared to the prior art. The increased magnetic torque transfer from outer rotor to inner rotor is the synergetic technical effect of using a back iron as outer rotor combined with permanent magnetic sections attached to the outer rotor and magnetized in alternating directions, and the use of an inner rotor having salient poles and consisting of only magnetic susceptible material. It does not have permanent magnetic material added to the rotor, i.e. permanent magnets mounted on the surface or embedded in the rotor.

A "section" is here to be understood as a part of the magnetic pole. It is, in some embodiments a section in a discrete magnet, in other embodiments a discrete magnet is magnetized with several sections, wherein each section has a specific magnetic orientation. As mentioned, it is an object of the present invention to increase the temperature range wherein the pump unit is working, this is done by having the non-permanent magnetic design combined with the rotor can, and the increased torque is achieved by having the outer rotor structure which is magnetic susceptible.

By removing all permanent magnetic material from the inner rotor to the outer rotor the permanent magnets are placed in a safe distance to the high temperature liquid and high temperature inner rotor. Still however, heat will radiate through the rotor can and through the air gap between rotor can and the magnets. At high temperatures this heat radiation can impact the magnets, and either lower the strength of the magnetic field, or fully demagnetize the magnets. In order to avoid this, a thermal cover or layer is placed on the side of the magnets that face the rotor can. The cover or layer can be glued to the magnets or otherwise adhered as a coating. At least some of the plurality of permanent magnets are covered fully or partly with the thermal protection layer. Preferably the cover or layer has reflective properties. Such reflection can be achieved with a nickel coating or a layer of white epoxy.

It is preferred that there along the inner surface of the outer rotor are areas with permanent magnets fixated to the inner surface followed by areas without permanent magnets fixated.

Advantageously, the reduced amount of magnets reduces the cost and also the complexity of the magnetic design. The outer rotor structure ensures a return path for the magnetic flux from the magnets through the structure.

In an embodiment the plurality of permanent magnets are magnetized with sinusoidal magnetization.

Advantageously, the sinusoidal magnetization provides a good magnetization setup.

In an embodiment each of the plurality of magnetic poles are arranged as a Halbach array. Halbach arrays are well known in the prior art. The invention can be realized with a full and continuous array of magnets covering 360 mechanical degrees of the inner circumference of the outer rotor. Or the Halbach array can be a so called "Reduced Halbach array" whereby the array only covers predetermined parts of the inner circumference of the outer rotor, namely only those parts where a magnetic pole is desired. Thus, neighboring magnetic poles built with Halbach arrays are separated by spaces not containing permanent magnets.

Advantageously, the Halbach array provides a magnetic design wherein the flux is primarily directed towards the rotor center.

In an embodiment the direction of the magnetic field of the permanent magnets is angled between a radial and a tangential direction, and has a magnetic angle in the range of 20 to 70 degrees in respect of the radial direction, i.e. in respect of a magnetic vector pointing towards the center of the inner rotor.

Advantageously, this design provides the same benefits as with the Halbach array.

In an embodiment the inner rotor is made of a non-laminated material.

Advantageously, the non-laminated material is easy to manufacture, especially the tooling of the protruding poles. Furthermore, the non-laminated material is prone to eddy current, which in this application can help dampening potential oscillations of the rotor shaft.

In an embodiment the inner rotor is encircled by a rotor sleeve.

Advantageously, the rotor sleeve minimizes the turbulence in the pumping fluid inside the inner rotor. The rotor sleeve is tubular in shape, formed as a cylinder and extends preferably in the full length of the inner rotor. The sleeve can be closed in both ends by end plates, hereby fully sealing the inner rotor towards the fluid. Alternatively one or both ends can be fully or partly open.

In an embodiment the rotor can comprises a temperature-insulating layer.

Advantageously, the temperature-insulating layer provides a higher temperature gradient across the air gap, and thereby an even further reduction in the temperature acting on the permanent magnets in the outer rotor. The layer or coating is covering all of the rotor can or only parts of it, and at least those areas which are facing the magnets on the outer rotor. The temperature-insulating layer can be deposited on the rotor can, e.g. in a chemical vapor deposition process, or a shielding material can be wound around the rotor can, covering its axial length in full or only partly. Rotor cans are seen in many different materials such as glass fiber and plastic, but for high temperature applications stainless steel is preferred.

On the outer rotor each of the plurality of magnets are in an embodiment neighbored by a non-permanent magnetic area. Thus, when following the inner circumference of the outer rotor for 360 degrees there is by example a sequence of magnet, space, magnet, space, magnet, space, magnet and space. In order to fixate the magnets to the outer rotor a retention member, also called supporting material, can be inserted in-between two neighbouring magnets, i.e. into the space. The supporting material 260 can be a flexible material exerting a pressing force on the sides of the magnets, hereby keeping them in place. Or it can be an extension of the circular structure, i.e. the back iron into the space.

In an embodiment the permanent magnets are fixated fully or partly by supporting material placed in between two neighboring magnets 605a, 605b in a place where no permanent magnetic material is present.

In an embodiment, the supporting material placed in between two neighboring magnets is made of an electrical conducting and non-magnetic material, such as copper or aluminum.

In an embodiment, the supporting material is made in first layer and a second layer, wherein the first layer is made of an electrical conducting and non-magnetic material and the second layer is made of a magnetic susceptible material.

In a further embodiment, the supporting material is made in first layer and a second layer, wherein the second layer is made of an electrical conducting and non-magnetic material and the first layer is made of a magnetic susceptible material.

In an embodiment the supporting material placed in between two neighboring magnets is made of a magnetic susceptible material.

Advantageously the flux is partly conducted in the supporting material and partly in the cylindrical structure.

In an embodiment the area between each of the multiple projections of the inner rotor are filled with an electrical conducting and non-magnetic material, such as copper or aluminum, forming a plurality elongated fillings, each of the elongated fillings are electrical connected to one another in both ends.

Advantageously, the filling of the areas increases the saliency of the inner rotor poles.

In an embodiment the pump is suitable for operating the inner rotor in a high temperature environment above 300 degrees Celsius.

In an embodiment the outer rotor comprises between two and eight magnetic poles, preferably four or six magnetic poles.

Advantageously, the low number of magnetic poles reduces the complexity of the design.

An improved manufacturing process can be obtained if the number of magnetic poles of the outer rotor is different from the number of salient inner rotor poles. In a preferred embodiment the number of outer rotor poles is lower than the number of salient inner rotor poles, which gives the advantage during manufacturing that fewer magnets have to be fixated to the outer rotor. The gluing process is speeded up. A further technical effect is that the difference in numbers of poles results in a gearing between the inner rotor and the outer rotor. Advantageously, the whole design provides a setup wherein the permanent magnet material is not in direct contact with the hot pumping fluid.

Another aspect of the present disclosure is a magnetic coupling comprising
- an outer rotor including a plurality of permanent magnets, arranged to form a plurality of magnetic poles, each magnetic pole having a plurality of sections;
- an inner rotor made of a magnetic susceptible material and free from permanent magnetic material, wherein the inner rotor is formed with multiple radial projections acting as salient inner rotor poles distributed over a circumference of the inner rotor,
- the outer rotor and the inner rotor being located coaxially to one another around an axial point and spaced apart from one another by an air gap,
- a rotor can arranged in the air gap, between the inner rotor and the outer rotor, so as to make a dividing section between the inner and outer rotor;
- the outer rotor has a cylindrical structure surrounding the plurality of magnetic poles, the cylindrical structure being made of a magnetic susceptible material for conducting a magnetic flux between the plurality of magnetic poles;
- each of the plurality of sections, comprising at least a section with a radial magnetic direction in respect of the axis and at least a section with a direction angled between a radial direction and a tangential direction in respect of the axis, and
- wherein the combined length of the sides of the plurality of permanent magnets cover less than 75% of the circumference of the cylindrical structure.

The advantages of the second aspect are similar to the advantages of the first mentioned aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF THE EMBODIMENTS

The present invention will now be explained in further details.

Figure 1:
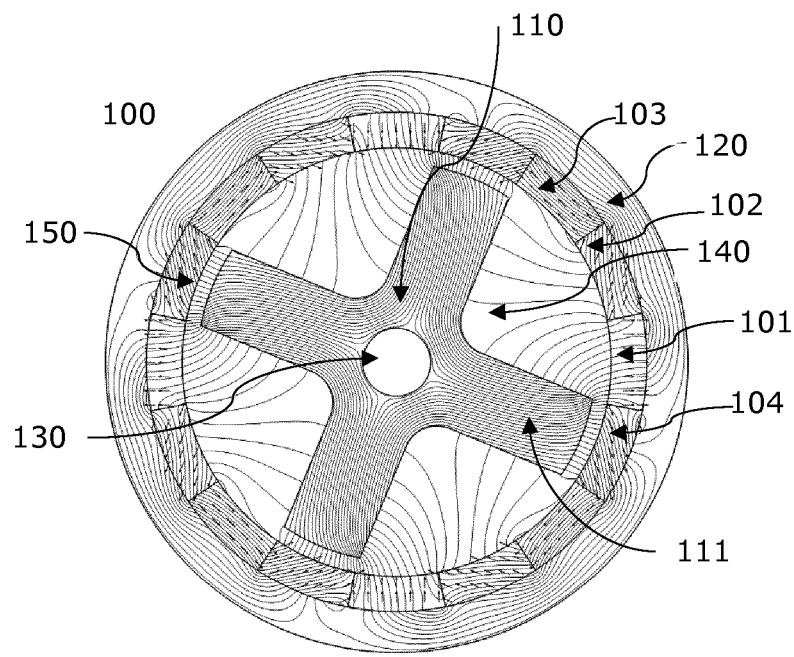
FIG. 1 shows a schematic view of an embodiment according to the invention of a magnetic coupling with Halbach magnetization.

A magnetic coupling uses the force of magnetism to transmit power from the drive to the shaft of the pump. As the illustration of FIG. 1 shows, the magnets 101-104 are located on the outer rotor and are completely separated from the inner rotor, only the force of magnetism connects the two. When a drive such as an electrical motor moves the magnets on the outer rotor it makes the inner rotor 110 turn as well, causing the shaft in the liquid, when used in a pump application, to rotate and create the required pumping action.

In contrast to traditional pumps where the motor shaft and the pump shaft are mechanically connected, the shaft does not penetrate through the two parts, as a rotor can provides the separation. This means that there are no holes or seals through which the liquid can escape. Thereby providing a hermetically sealed and safe pumping, especially when pumping liquids with very high temperature, but also when pumping liquids with high pressure, or a combination of both.

In an aspect of the invention a pump unit with at least one impeller comprises a coupling, wherein the coupling is mechanically connected to the at least one impeller via an inner rotor, and an outer rotor is connected to an electrical motor arranged to produce a rotational torque. The pump being arranged to circulate a fluid by the impeller, the coupling comprises an outer rotor including a plurality of permanent magnets 101, 201 arranged to form a plurality of magnetic poles, each magnetic pole having a plurality of sections.

An inner rotor 110, 210 made of a magnetic susceptible material, wherein the inner rotor is formed with multiple radial projections 111, 211 acting as salient inner rotor poles distributed around an axis 130, 230 or an axial point of the inner rotor 110, 210. The inner rotor is formed with multiple radial projections. This is to be understood literally, but also from a magnetic perspective, that the inner rotor is designed to produce a salient pole design, such a design known to the skilled person. FIG. 7 shows a few examples of how a salient pole design can be made. The invention is not limited to the embodiments shown in FIGS. 1, 2, 4 and 6. The outer rotor and the inner rotor are located coaxially to one another around an axis 130, 230 and spaced apart from one another by an air gap 150,250. The outer rotor has a cylindrical structure 120, 220 surrounding the plurality of magnetic poles 105, 205, the cylindrical structure being made of a magnetic susceptible material for conducting a magnetic flux between the plurality of magnetic poles 105, 205. Each of the plurality of magnetic poles comprises at least a section with a radial magnetic direction in respect of the axis and at least a section with a direction angled between a radial and a tangential direction in respect of the axis.

Figure 3:
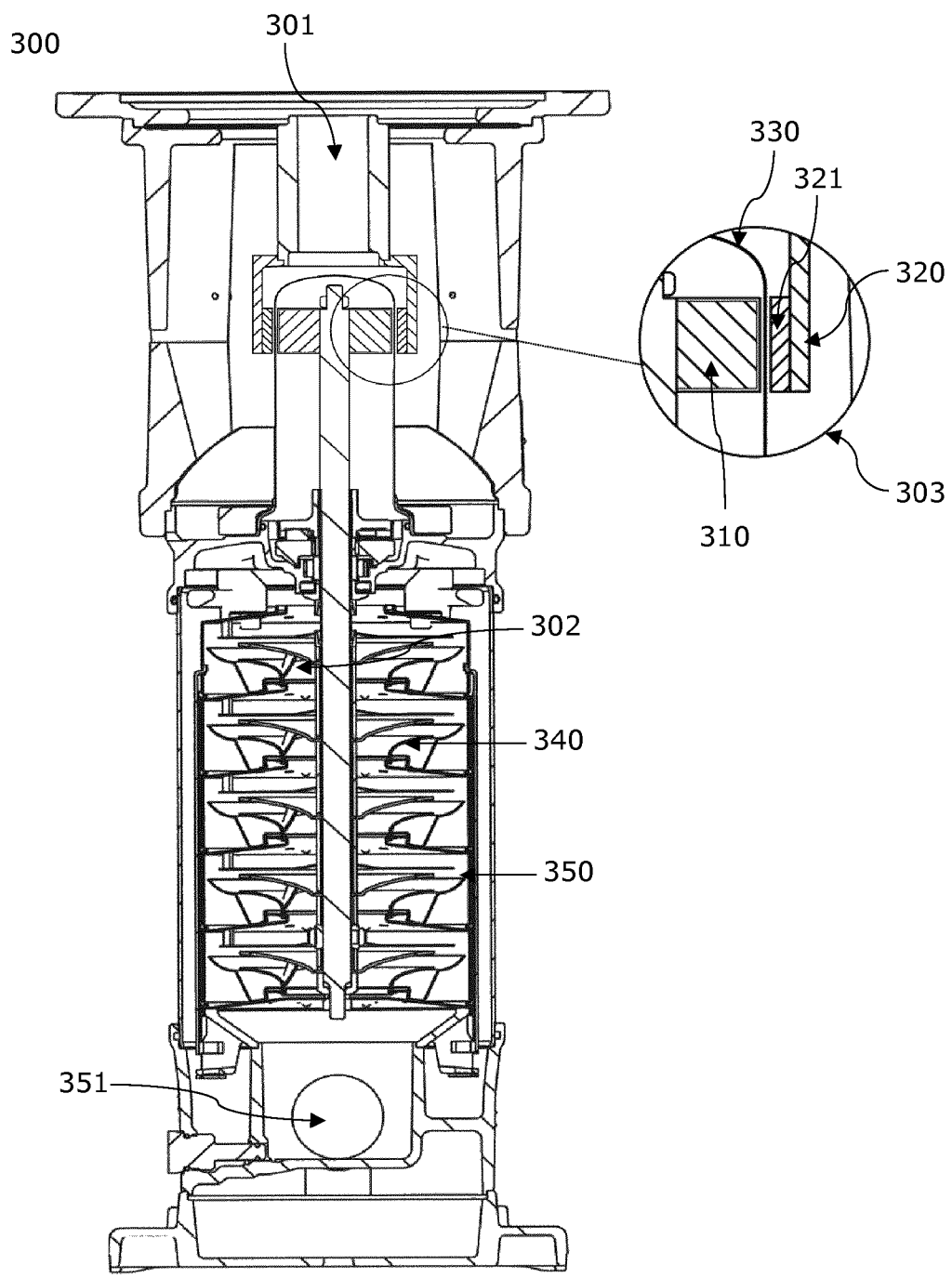
FIG. 3 shows an embodiment of a pump unit according to the invention with a magnetic coupling with a rotor can.

FIG. 3 shows an embodiment of the invention. A shaft 301 from an electrical motor (not shown) drives the multistage centrifugal pump 300. The shaft 301 communicates with an inner shaft 302 through a coupling 303. The coupling has an outer rotor 320, with permanent magnets 321 and an inner rotor 310. The inner rotor 310 drives the inner shaft 302 connected to an impeller stack 340 in the pump casing 350 and the impellers displace a liquid fluid out through the pump housing outlet 351.

The impeller stack has in this example five impellers. Between the outer rotor 320 and the inner rotor 310 there is disposed a separation 330 which hermetically isolates the rotor outer 320 from the inner rotor 310. Typically, the liquid fluid is located around the inner rotor, and thus the liquid should not flow to the side where the outer rotor is arranged. The separation is often referred to as a rotor can 330.

Figure 2:
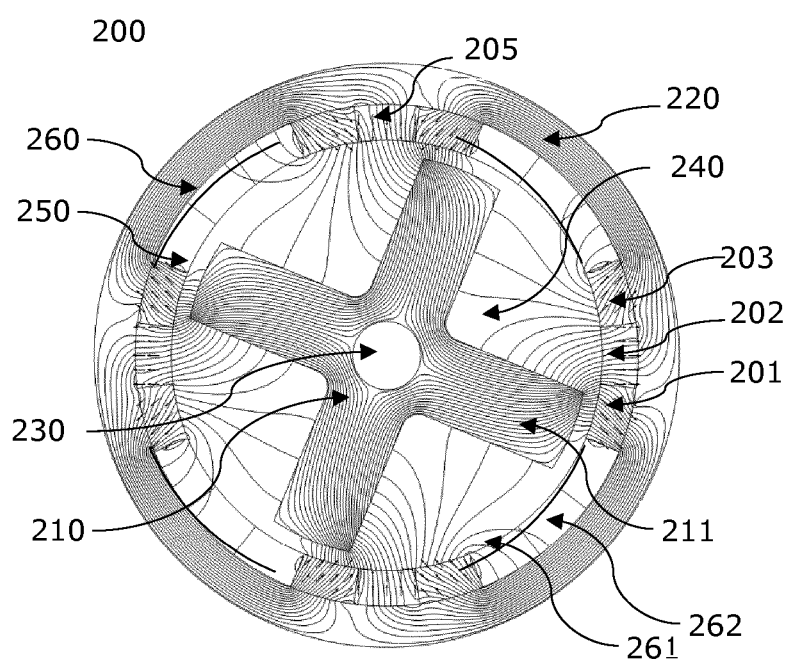
FIG. 2 shows a schematic view of an embodiment of another magnetic coupling according to the invention with reduced Halbach magnetization.

The magnetic design of the coupling is shown in FIGS. 1 and 2. The coupling 100, 200 has an inner rotor 110, 210 and an outer rotor 120, 220. The inner rotor 150, 250 in the embodiment has four poles 111 for conducting the magnetic flux from permanent magnetic material (permanent magnets) 101-104 through an airgap 150,250. The magnetic flux lines are drawn on the coupling 100. The outer structure of the coupling 120, 220 works as a back-iron or yoke, which conduct parts of the magnetic flux from pole to pole.

Working with permanent magnetic material in a high temperature environment it is important to consider the Curie point for the permanent magnetic material. The Curie point, also called Curie Temperature, is the temperature at which certain magnetic materials undergo a sharp change in their magnetic properties.

Permanent magnetism is caused by the alignment of magnetic moments and induced magnetism is created when disordered magnetic moments are forced to align in an applied magnetic field.

The Curie temperature is the critical point where a material's intrinsic magnetic moments change direction. Materials have different structures of intrinsic magnetic moments that depend on temperature. At a material's Curie Temperature those intrinsic magnetic moments change direction.

It is known to the skilled person that magnetic material loses their magnetic properties at temperatures well below the so-called Curie temperature, therefore the working temperature of the magnetic material has to be lower than the Curie temperature.

In some pumping applications, the liquids to be pumped have particularly high temperature, such as oil in the range 250 to 400 degrees Celsius. The driven rotor or inner rotor therefore has to be dimensioned to withstand the high temperatures, that can reduce either the magnetic field strength, which comes from the magnet itself, or simply destroy it.

To avoid this, either the temperature of the medium to be pumped has to lower, or cooling the outer rotor and its magnets and if possible, also cooling the inner rotor. These cooling devices are cumbersome and expensive, and in case of failure will cause a destruction of magnetic coupling.

In the embodiments presented here all magnetic materials from the inner rotor is removed, and instead placed on the outer rotor. Permanent magnetic material is thereby removed from the high temperature exposure of the medium itself, and instead disposed at a lower temperature.

There are mainly two things that characterize a magnetic material.

1) Relative permeability (Myr)—The ability to carry a magnetic flux with the least possible magnetic loss.

2) Intrinsic coercivity (Hci)—The resistance against magnetization and demagnetization.

A soft magnetic material (i.e. highly pure annealed iron) has a high permeability. (Usually Myr >40) and a low Hci <50 kA/m, but also down to 0.8 A/m.

A hard magnetic material also called a permanent magnet has close to unity relative permability Myr~1 and a high Hci >50 kA/m, but also up to 3000 kA/m.

In a few cases i.e. for AlNiCo magnets, the relative permability go as high as 40. These AlNiCo magnets are not considered permanent magnets or permanent magnetic material in the context of the present invention.

The inner rotor 110,210 has no permanent-magnetic material installed, instead the inner rotor is exclusively or mainly composed of soft magnetic material, preferably iron or ferritic material, even very low grade magnets, such as AlNiCo magnets, can be used. As mentioned AlNiCo magnets are here not considered to be permanent magnets, because of its relatively low coercivity compared to Samarium Cobalt or Neodymium magnets.

An advantage of the AlNiCo magnets is that they have a relatively high Curie temperature compared to higher-grade magnets, thus the inner rotor even with AlNiCo magnets can operate with a high temperature liquid. Alnico alloys have some of the highest Curie temperatures of any magnetic material, around 800° C.

This rotor with iron or a ferritic material can be designed to have a Curie temperature of 800 degrees Celsius, and as long as the liquid temperature is below this limit, it maintains the iron ferromagnetic properties.

Getting back to FIG. 1, this figure shows a design where inner surface of the outer structure 120 is filled with permanent magnets 101-104. The magnets 101-104 create a magnet pole, the magnetic poles are repeated all around the circumference of the outer structure, alternating the flux direction, so a traditional north-south pole setup is achieved.

In a particular embodiment, the magnets on the outer rotor are arranged as a Halbach array, i.e., as discrete magnets, each of which is magnetized transversely, longitudinally or obliquely.

The permanent magnets 101-104 are magnetized in a manner so the magnetic flux primarily flows inside the outer rotor. Such a magnetization is known in the prior art as a Halbach array. Halbach array is an arrangement of permanent magnets that augments the magnetic field on one side of the array, while cancelling the field to near zero on the other side. This is achieved by having a spatially rotating pattern of magnetization.

By looking at FIG. 1 it can be seen that the magnet 101 is magnetized with a flux direction pointing at the center axis 130. The flux direction of the magnet 103 points in a direction tangential to the circumference. The magnet 102 has a flux direction pointing in a direction angled about 45 degrees in respect the center axis, whereas magnet 104 is angled 90 degrees in respect of magnet 102. Part of the magnetic flux is conducted in the outer rotor structure, known as the back-iron 120, 220 (i.e. the cylindrical structure), the material of the back iron 120 therefore need to be of a magnetic material as well, or more precisely a magnetic susceptible material The lines drawn on the back-iron 120, 220 shows the magnetic flux lines.

The thickness of the back iron 120, 220 should be designed to conduct the flux, so the material avoids magnetic saturation.

The use of the magnetic susceptible back-iron 120, 220 shows a surprisingly higher torque in the embodiments of the coupling application, compared to couplings without back-iron with magnetic flux ways.

The attachment of the permanent magnets 101-104 can be ensured by using an adhesive material. It has to be noted that due to the centrifugal forces magnets 101-104 will be forced towards the cylindrical structure or back iron 120. In the embodiment of FIG. 1 the discrete magnets form a full circle and therefore they are almost self-retained, although it is expected that some adhesive is needed is order to ensure that the temperature expansion coefficient of the magnets and the cylindrical structure 120 doesn't work against each other.

The area or space 140 is the area between the inner rotor poles.

The flux direction of the magnets 101-105 each have one direction, so when talking about a flux direction in the previous paragraph this is to be understood as the flux direction of a center point of the magnet. The magnets are often magnetized prior to assembly in the coupling.

The meaning of the wording circumference of the cylindrical structure, is to be understood as the inner circumference of the cylindrical structure 220, such as seen on FIG. 2 where about 50% of the circumference is covered with magnets.

In the embodiment of FIG. 2 the retention of the magnets can be ensured by adhesive glue.

In an embodiment the retention is made by including additional material 260 where there are no magnets. Retention is then achieved through a press fitting effect, where the additional material exerts a mechanical holding force on the short sides of the outermost placed magnets, e.g. magnet 203. The additional material can be made of the same material as the back iron 220. The short side of magnet 203 facing the empty space of FIG. 2 can be slanted or conical to allow for a better grip from the additional material.

An advantage is that when the additional material is made of a flux conducting material it is possible to decrease the material thickness of the back iron 120, as part of the flux runs in the additional material in between the magnetic poles.

On the outer rotor each of the plurality of magnets are in an embodiment neighbored by a non-permanent magnetic area. Thus, when following the inner circumference of the outer rotor for 360 degrees there is by example a sequence of magnets, space, magnets, space, magnets, space, magnets and space. In order to fixate the magnets to the outer rotor a retention member, also called supporting material 260, can be inserted in-between two neighbouring magnets, i.e. into the space. The supporting material 260 can be a flexible material exerting a pressing force on the sides of the magnets, hereby keeping them in place. Or it can be an extension of the circular structure, i.e. the back iron into the space, whereby it appears that recesses are made in the inner surface of the cylindrical structure 220, the receive the magnets.

In an embodiment the permanent magnets 101-104 are fixated fully or partly by supporting material 260 placed in between two neighboring magnets 605a, 605b in a place where no permanent magnetic material is present.

In an embodiment the supporting material 260 placed in between two neighboring magnets is made of an electrical conducting and non-magnetic material, such as copper or aluminum.

In an embodiment the supporting material is made in first layer 261 and a second layer 262, wherein the first layer 261 is made of an electrical conducting and non-magnetic material and the second layer 262 is made of a magnetic susceptible material.

In a further embodiment the supporting material is made in first layer 261 and a second layer 262, wherein the second layer 261 is made of an electrical conducting and non-magnetic material and the first layer 262 is made of a magnetic susceptible material.

In an embodiment the supporting material 260 placed in between two neighboring magnets is made of a magnetic susceptible material.

Advantageously the flux is partly conducted in the supporting material 260 and partly in the cylindrical structure 220. In an embodiment the magnets are attached to the outer structure by means of fasteners such as screws etc. In an embodiment the magnet retention is ensure by a dovetail design in the magnets and the outer structure. A recess made in the magnets and matching protruding elements are attached to the outer rotor structure.

In an embodiment the combined length of the sides of the plurality of permanent magnets where they are adhered to inner side of the outer rotor is less than 75% of the circumference of the cylindrical structure, i.e. of the inner side of the outer rotor In another embodiment the plurality of permanent magnets covers less than 50% of the circumference of the cylindrical structure.

In an embodiment the permanent magnets 101-104 are covered with a a thermal protection layer (not shown in FIG. 1). At high temperatures heat radiation can impact the magnets, and either lower the strength of the magnetic field, or fully demagnetize the magnets. In order to avoid this, a thermal cover or layer is placed on the side of the magnets that face the rotor can, i.e. the side opposite to the cylindrical structure 120. The cover or layer can be glued to the magnets or otherwise adhered as a protective coating. At least some of the plurality of permanent magnets are covered fully or partly with the thermal protection layer. Preferably, the cover or layer has reflective properties. Such heat reflection can be achieved with a nickel coating or a layer of white epoxy resulting in a reflective mirror effect.

FIG. 2 shows in details a different magnetization scheme compared to the one of FIG. 1. Here each pole 205 comprises three sections 201, 202, 203. The pole 205 and its opposite pole has flux directions generally pointing towards the center axis, whereas the two other poles has flux directions generally pointing away from the center axis 230. The three sections are magnet 201 with a flux direction angled of from the center axis, the angle is about 45 degrees, and the magnet 202 points away from the center axis 230. The last magnet 203 has a flux direction angled away from the center axis, the angle is about 45 degrees in opposite direction of magnet 201.

In embodiments of FIGS. 1 and 2 the magnets used are of discrete type magnets. The magnets are often anisotropic type magnets.

In an alternative embodiment, isotropic magnet material is used, i.e. magnetic material without first unidirectional elementary magnets. Such material is magnetized after the manufacturing process, e.g. a sintering process.

In the embodiments of FIGS. 1 and 2 the direction angled between a radial and a tangential direction is with an angle in the range of 20 to 70 degrees or the range of −20 to −70 degrees in respect of the radial direction.

In an embodiment an alternative magnetization is used, which is called sinusoidal magnetization.

Figure 8A:
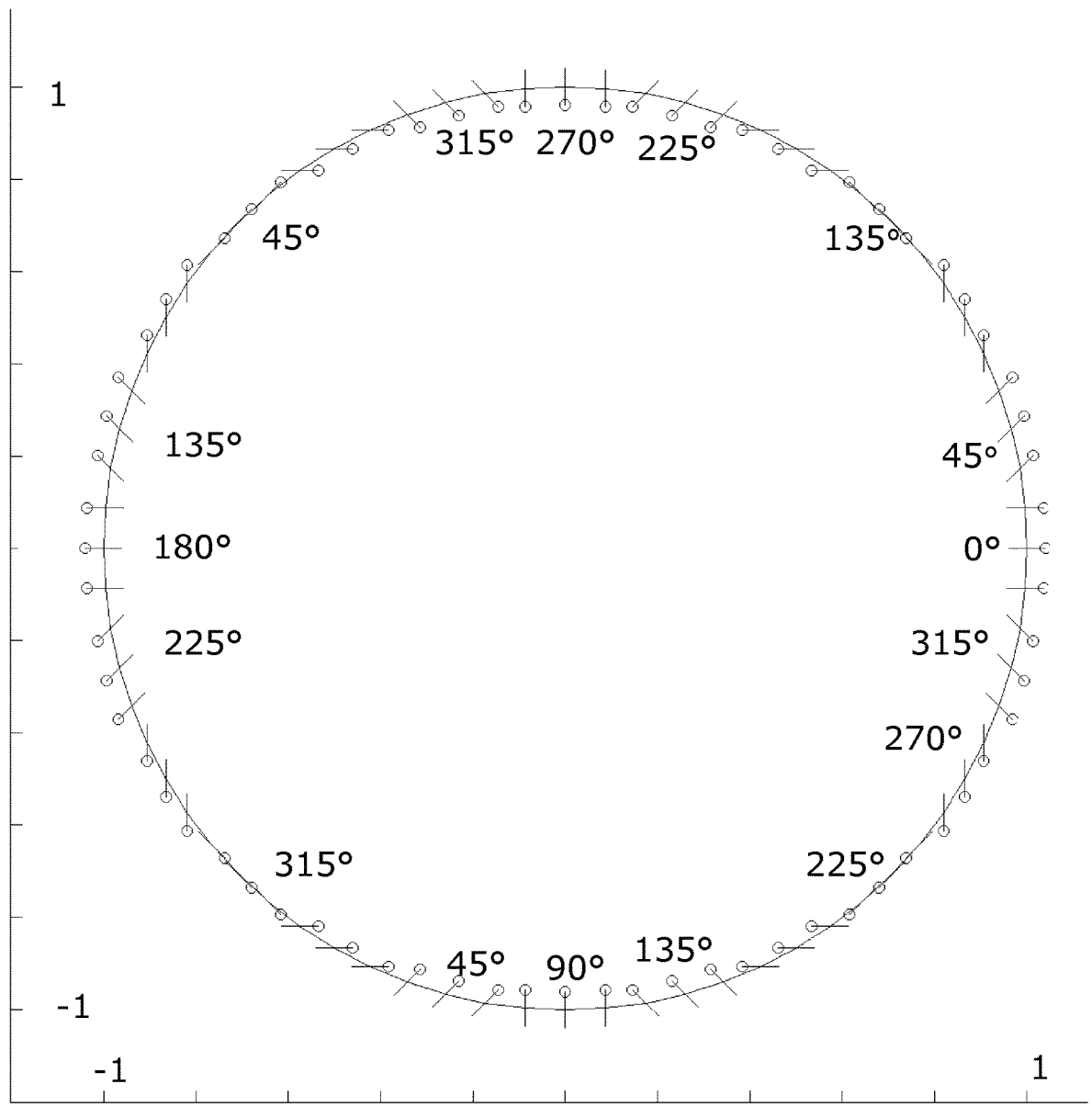
FIG. 8*a* shows an example of how the magnets in an outer rotor with Halbach array are magnetized.
Figure 8B:
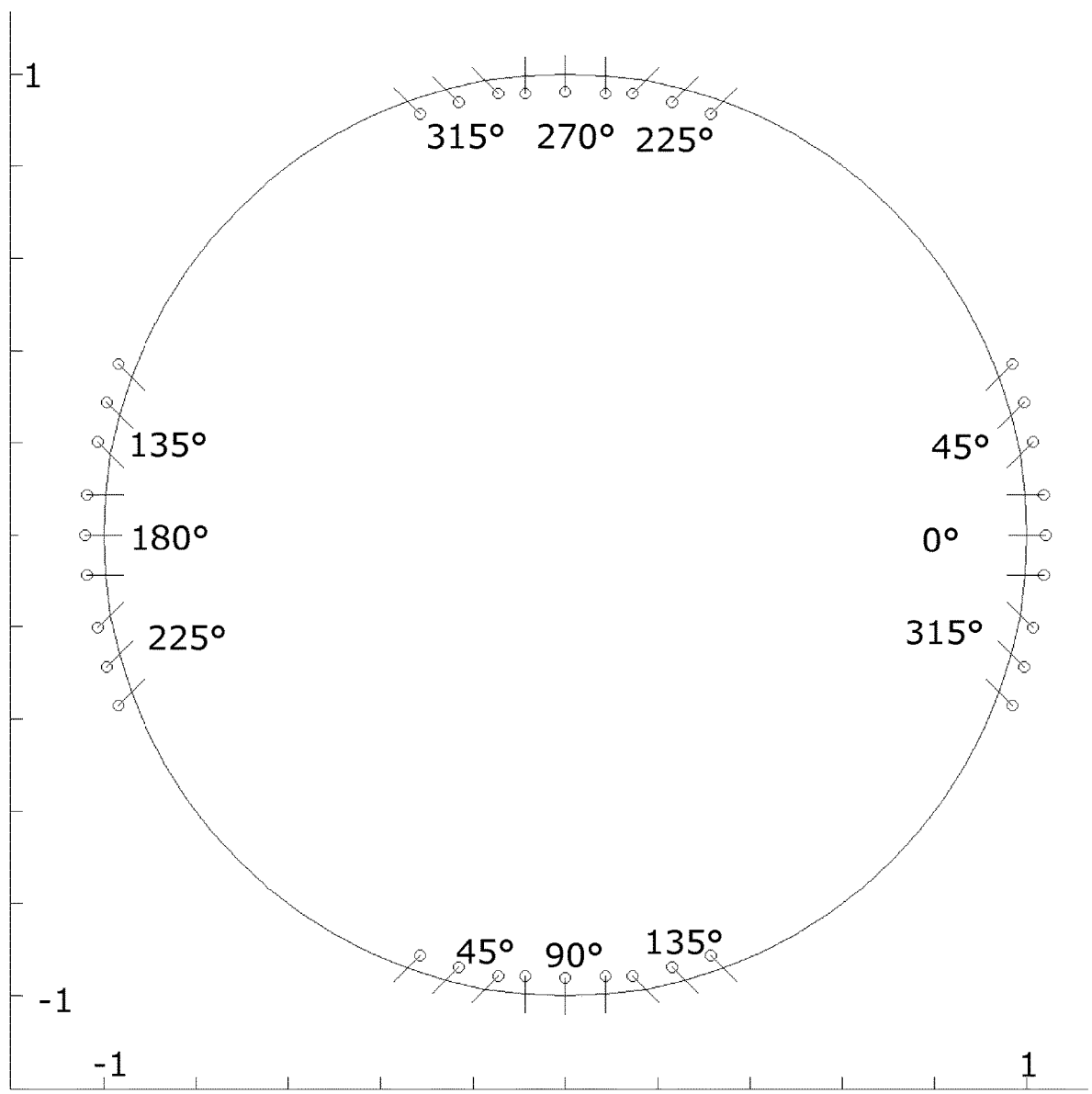
FIG. 8*b* shows an example of how the magnets in an outer rotor with reduced Halbach array are magnetized.

FIG. 8*a* shows an example of how the magnets in an outer rotor with Halbach array are magnetized. The horizontal and vertical axes shows the normalized values of the radius from the center axis of the outer rotor to the magnets mounted on the inside of the outer rotor. By example a magnetic pole is generated at the "bottom" of the figure where the magnetization sequence 0,0,0,45,45,45,90,90,90,135,135,135,180, 180,180 is shown. All values are degrees, and informs about the magnetization angle of a section. Thus 45,45,45 means that this section of the magnetic pole is magnetically oriented in a 45 degrees orientation with the magnetic flux going into the interior of the outer rotor. FIG. 8*b* shows an example of how the magnets in an outer rotor with reduced Halbach array are magnetized. Reduced Halbach array means that the array of Halbach magnetized magnets is not continuously and fully distributed across the 360 degrees circumference of the inner side of the outer rotor, but that parts of said circumference has a Halbach array, and other parts of the circumference are free of permanent magnets. In this Figure it also applies that for each magnetic angle, three sections are magnetized in the same direction, in this embodiment half of the magnetic material has been removed. For this four pole designed rotor, each of the magnetic poles comprises a magnetization with a direction radial to a center axis, and a direction angled plus/minus 45 degrees (45 degrees or 315 degrees) in respect of the radial direction.

Figure 9:
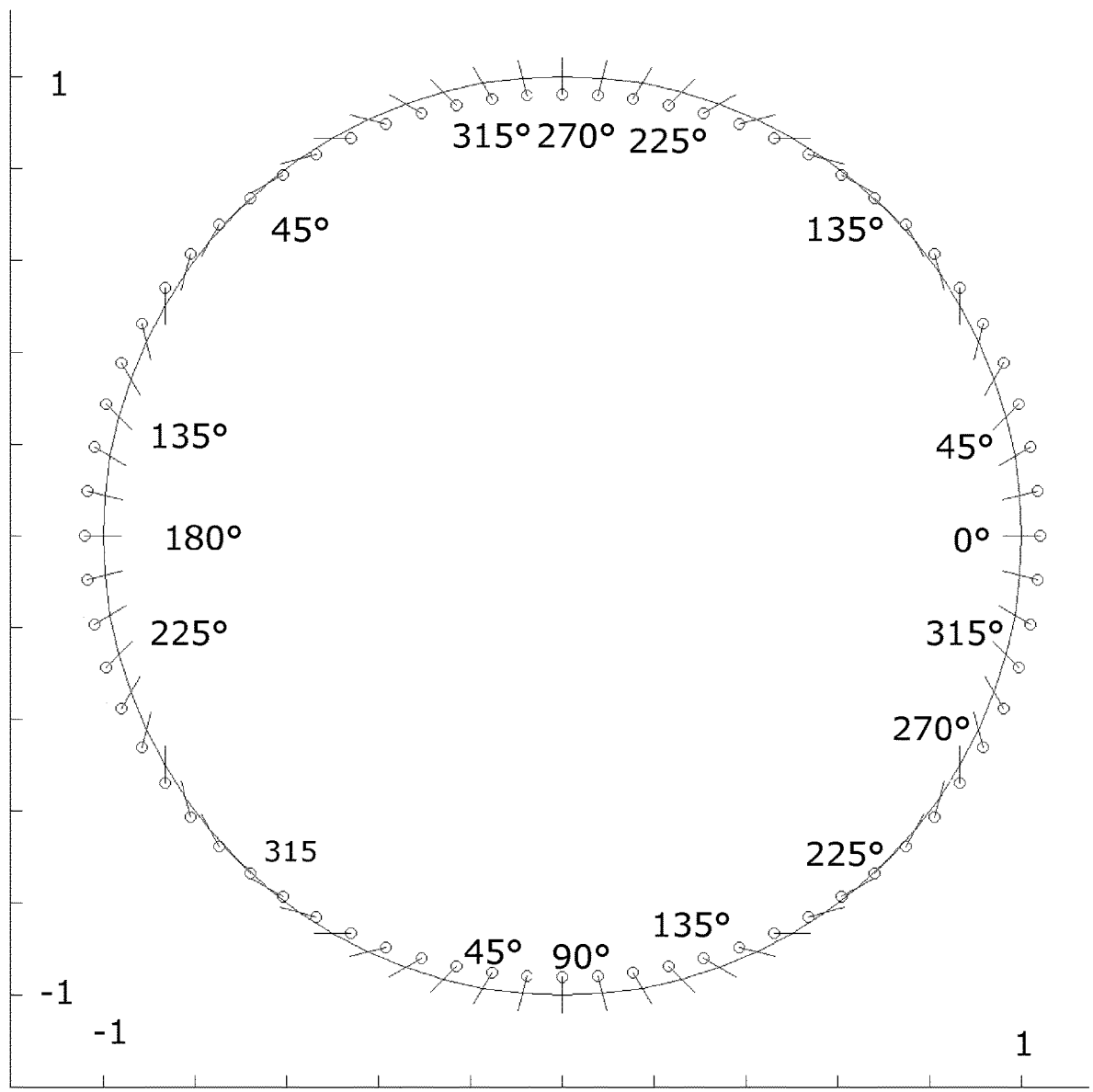
FIG. 9 shows an example of how the magnets in an outer rotor with sinusoidal magnets array are magnetized.

FIG. 9 shows how sinusoidal magnetization can be realized in an embodiment. Here flux direction follows a sinusoidal pattern, where a larger number of magnetization steps are used to achieve the sinusoidal magnetization.

FIG. 9 shows, similar to FIG. 8*a* or 8*b*, an example of how the magnets in an outer rotor with sinusoidal magnetization is magnetized. The number of discrete steps are much higher with sinusoidal magnetization compared to the Halbach array. In FIG. 9 each of the sections have their magnetization direction. So each section is unique.

Figure 4:
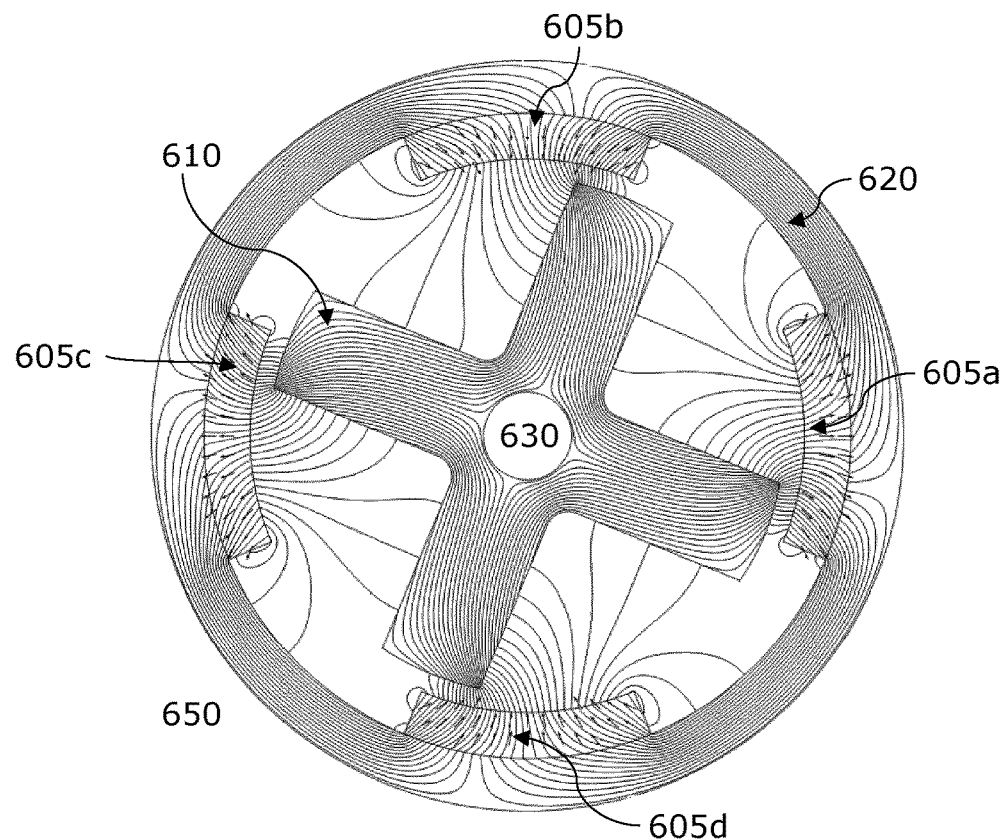
FIG. 4 shows a schematic view of an embodiment according to the invention of a magnetic coupling with reduced sinusoidal magnetization

In an embodiment with reduced magnetic material, but also with sinusoidal magnetization as in FIG. 4, the angles would be similar to those of FIG. 9, except that many segments are missing, and therefore not all the corresponding angles from FIG. 9 applies. As can be seen from a comparison between FIG. 4 and FIG. 9 all the tangential magnetic directions are omitted in the design of FIG. 4.

Figure 10:
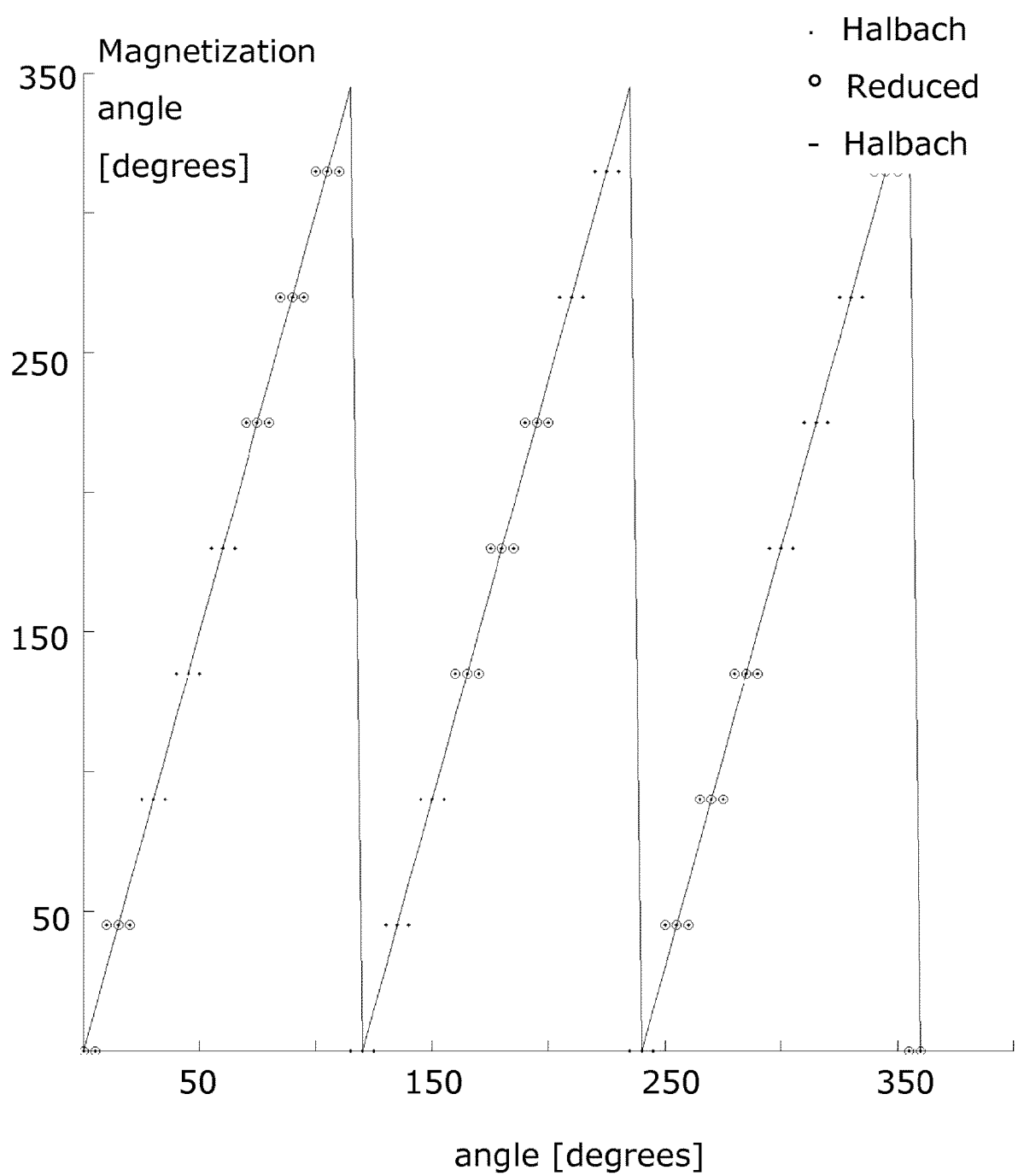
FIG. 10 shows a comparison between different magnetization strategies.

The higher number of discretization is shown FIG. 10, where sinusoidal magnetization the Halbach array, and the reduced Halbach array magnetization are compared. The horizontal axis shows the mechanical degrees when following the inner side of the outer rotor where the magnets are placed. The vertical axis of FIG. 10 shows the magnetization angle (or magnetic orientation) in degrees at a point on a magnet. Thus, for a Halbach array marked by a black dot, starting a zero mechanical degrees and moving fifty mechanical degrees upwards along the magnets on the inner side of the outer rotor it is seen from the figure, that the orientation of the magnetic field is 135 degrees.

FIG. 4 shows an embodiment where about 50% of the inner circumference of the back-iron 620 is covered with magnets 605. An inner rotor 610 is made of a magnetic susceptible material, here with four poles, and the inner rotor 610 has a center axis 630. There is a magnetic air gap 650, between the inner rotor poles and the magnets 605. The magnets 605*a-d* are all magnetized with sinusoidal magnetization, as can be seen from the flux lines on each of the magnets. The magnets 605*a* and 605*c* both have flux lines generally pointing away from the center axis 630, whereas magnets 605*b* and 605*d* have flux lines generally pointing towards the center axis 630. The inner rotor 610 is located where maximum torque is produced, in a no-load situation the inner rotor will turn about 20-25 angular degrees and each pole will face the center of each magnet respectively.

In a variation of the embodiment of FIG. 4 the magnetic poles 605*b* and 605*d* are removed and replaced by soft magnetic material, e.g. the same magnetic susceptible material as used for the cylindrical structure 620. Thus, the magnetic coupling has a two pole outer rotor and a four pole inner rotor resulting in a magnetic gearing. The amplitude of the magnetic torque transferred between inner and outer rotor is lowered, but an advantage with this design is that fewer magnets must be fixated to the outer rotor in the manufacture of the coupling.

The magnetization orientation of the magnets shown in FIG. 4 is that of a Shaped Field Magnet. In a traditional magnet, the anisotropy within and outside a magnet is made as uniform as possible. A Shaped Field Magnet (SFM) has a field with a deliberate divergence from the anisotropic model. In the SFM configuration, the magnetic field is shifted toward one side of the magnet. Some of the advantages of the shaped field magnet include:

Higher field strength in the working zone for the mass and size of the magnet

Substitution of higher-temperature, lower-remanence materials

Increased design freedom, with less concern for handling stray field effects

Reduction of overall system weight for equipment using the SFM

As the field strength of the SFM is skewed to the working volume and less of the field is wasted in bridging neighboring magnets, torque is increased. The SFM construction also directs less of the magnetic field into the back iron, reducing the magnetic requirements and back iron thickness. This can reduce the overall size and weight of the magnetic coupling, resulting in greater efficiency, cost savings, reduced wear, and extended bearing life.

In summary three types of magnetization that can be used in the invention full Halbach, reduced Halbach and sinusoidal magnetization—where sinusoidal magnetization provides the most effective solution, but also the most cost expensive solution.

In an embodiment, the pump unit or the coupling has an outer rotor where the plurality of permanent magnets are magnetized with sinusoidal magnetization.

Another aspect of the invention comprises a magnetic coupling (100, 200). The magnetic coupling comprises an outer rotor including a plurality of permanent magnets arranged to form a plurality of magnetic poles 205, 605, each magnetic pole having a plurality of sections. The sections can be in discrete magnets, but can also be understood as sections within the same magnet. An inner rotor is made of a magnetic susceptible material, wherein the inner rotor is formed with multiple radial projections acting as salient inner rotor poles distributed over a circumference of the inner rotor. The outer rotor and the inner rotor (210, 110) being located coaxially to one another around an axial point (230, 130) and spaced apart from one another by an air gap (250, 150), and the outer rotor has a cylindrical structure (120, 220) surrounding the plurality of magnetic poles. The cylindrical structure is made of a magnetic susceptible material for conducting a magnetic flux between the plurality of magnetic poles. Each of the plurality of sections comprises at least a section (101, 201) with a radial magnetic direction in respect of the axial point (130, 203) and at least a section (102, 202) with a direction angled between a radial direction and a tangential direction in respect of the axial point.

Figure 4A:
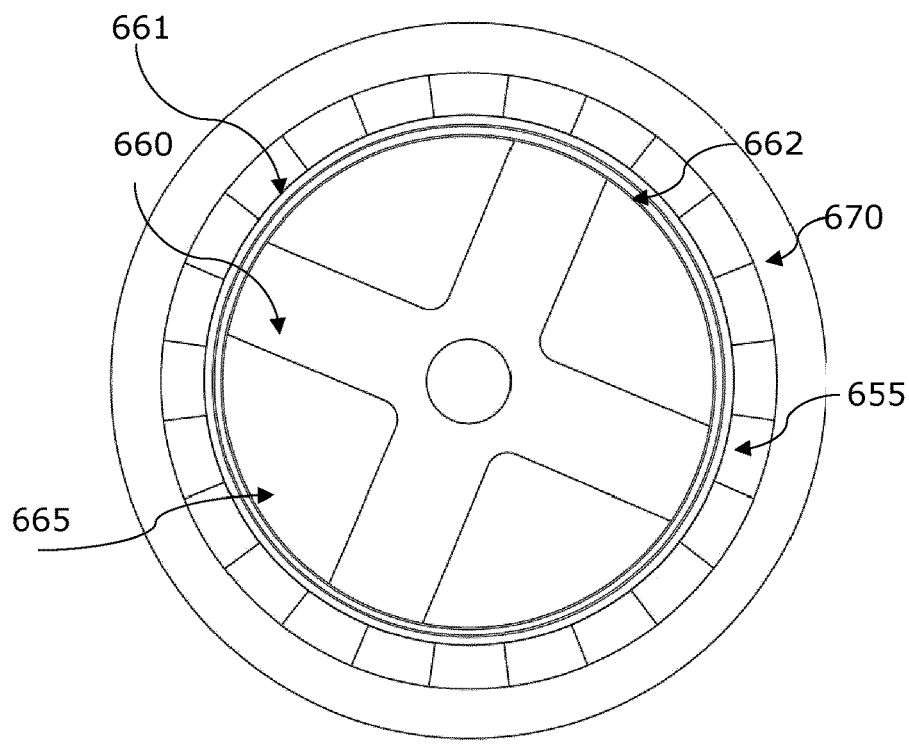
FIG. 4*b* shows a schematic view of an embodiment according to the invention of a coupling with a rotor can and an inner rotor sleeve.

FIG. 4a shows an embodiment of a coupling with an inner rotor 660, where the inner rotor is encircled with a rotor sleeve 661. The rotor sleeve 661 provides the advantage of sealing the inner rotor from the fluid which is being pumped, and thereby is the fluid not disturbing the rotation of the inner rotor. The rotor sleeve is cylindrical and has an axial extension that corresponds at least to the axial extension of the inner rotor. Thus it has a tubular shape.

In an embodiment the rotor sleeve 661 is formed as cylinder with a top and bottom end plates (not shown). The area 665, in between each of the poles, can in some embodiments be filled with a material to help increasing the saliency of the inner rotor 660.

In an embodiment the rotor sleeve is not fully sealing the inner rotor 660 from the fluid, i.e. the end plates are made with some perforations allowing partly flow of fluid in the areas 665 between the poles.

The rotor sleeve 661 can be made of stainless steel or a ceramic material. It is important to note that is has to work in a high temperature environment and that the material should not short circuit the magnetic flux.

Further shown in FIG. 4a is an outer rotor with a cylindrical outer structure 670 and a plurality of magnets 655, the design can either be with full magnets as in FIG. 1 or with partly magnetic material as in FIG. 2.

In the airgap between the outer rotor and the inner rotor is shown a rotor can 662, which seals the outer rotor from the fluid. The rotor can 662 has several effects. It works primarily as media divider, but it also sets a barrier for pressure and temperature.

The temperature effect is import as the rotor can 662 in some embodiments is made of a material with high insulation properties. It can consist of a ceramic material, or the rotor can 662 is made in a sandwich design with an inner and outer shell wherein between an insulation material is provided.

Figure 6:
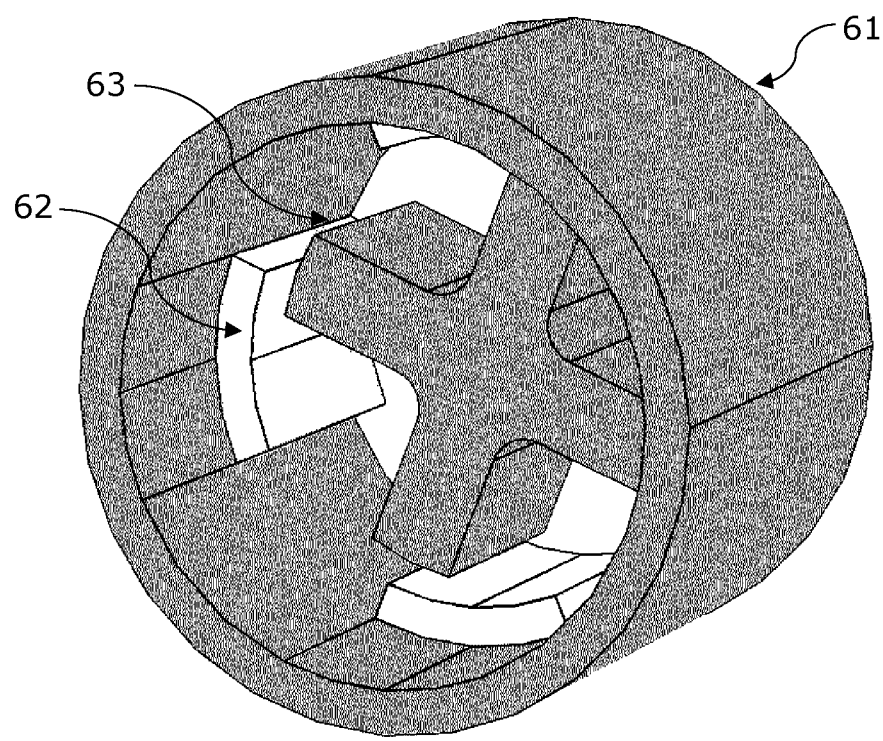
FIG. 6 shows an embodiment according to the invention of the coupling with a support structure.
Figure 7:
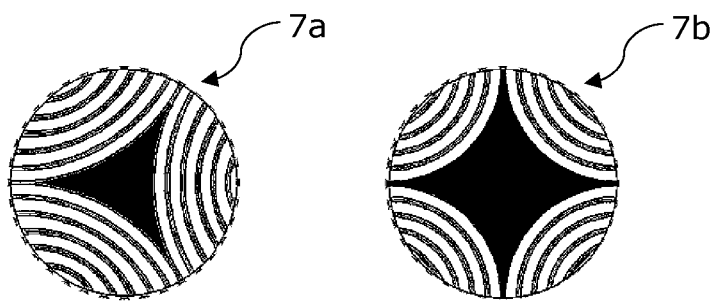
FIG. 7 shows two different designs of the inner rotor.

FIG. 6 shows an embodiment of the coupling with a support structure 61 and permanent magnets 62 attached to the support structure 61, forming the outer rotor. An inner rotor 63 with 4 poles is operating inside the outer rotor.

The axial length of the magnets 62 of the outer rotor does not have to match the axial length of the inner rotor 63. The same applies to the support structure or back iron 61. For a structural design, it is advisable that the support structure has the same or a larger axial length than the axial length of the magnets 62 of the outer rotor.

An advantage of the different axial lengths is a better magnetic performance in the end axial regions of the magnets.

The number of magnetic poles of the outer rotor and the inner rotor as well depends on the magnet design.

In an embodiment the outer rotor comprises an even number of magnetic poles.

In another embodiment the outer rotor comprises an odd number of magnetic poles.

FIGS. 1 and 2 shows an embodiment where the outer rotor has four poles 111.

Designs of the inner rotor with an odd number of poles can be realized, FIG. 7 shows two different designs, one with three poles (7a) and one with four poles (7b). The inner rotor designs shown in FIG. 7 are all rotor designs where the saliency is obtained by having cut-outs in circular rotor lamination sheets. The cut-out area can be filled with a filler. The black centre of the two figures is the inner rotor core consisting of magnetic susceptible material. Both inner rotor cores have multiple radial projections, namely three and four respectively. The white areas represent a filler.

The invention has surprisingly shown that by using half the amount of magnet material compared to the prior art, reduced magnetic losses are achieved, i.e. high torque transmission. For the following reasons. A magnetic field strength decreases in a known manner with increasing temperature. When operating at a lower temperature the magnetic field strength is stronger, and contributes to the higher torque transmission.

At higher temperature the field strength drops, Samarium cobalt magnets are de-rated by a factor 0.03 per degree Kelvin. Therefore, it must be taken into consideration in the design for such a coupling in a pump, that the magnetic field drops at high temperature. By placing all magnetic material remote from the high temperature, however, this effect from the field drop is small, and the decrease in torque transfer is thus advantageously less.

The advantage achieved is that the magnets are better protected against sudden high temperatures, which can totally ruin the properties of the magnet. Samarium-cobalt magnets have a maximum working temperature, which is typically about 250-350 degrees, and above this temperature they lose their magnetization and are useless. The invention thus improves the pump's magnetic properties at two important points.

Figure 5:
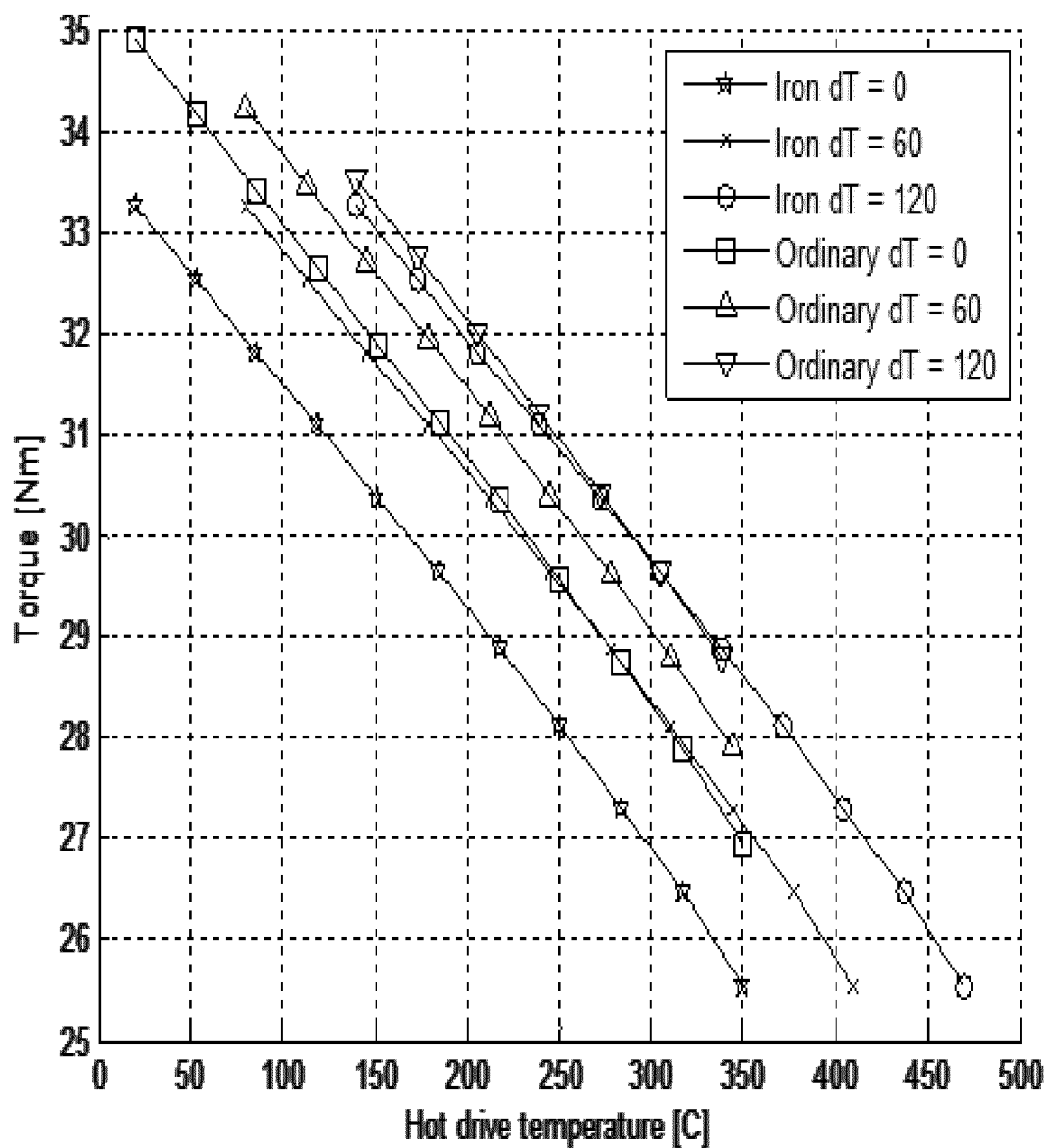
FIG. 5 shows a series of curves where torque is plotted as a function of temperature.

FIG. 5 shows a series of curves where torque is plotted as a function of temperature. There are six different plots in FIG. 5. Three plots for an ordinary coupling known from the prior art, with magnet on both the inner and outer rotor. The other three plots are for a coupling according to the invention.

For each of the couplings the six plots show the difference temperature dT, at dT equals 0, 60 and 120 degrees. The difference temperature is the difference between the temperature of the inner rotor and the outer rotor. After some time of operation, the inner rotor will get the same temperature as the liquid. The inventive design has the legend "Iron dT" and the prior art design "Ordinary dT".

We start looking at the inventive design and the curve labelled "Iron dT=120". If dT is 120 degrees the liquid flowing around the inner rotor or around the sleeve surrounding the inner rotor can be up to 470 degrees Celsius. The calculation assumes a Curie temperature of 350 degrees Celsius, and therefore the magnets of the ordinary design fail at temperatures above 350 degrees.

In the prior art couplings are known to have permanent magnetic material on both the inner and the outer rotor. Thus, a de-rating occurs for both sides, meaning that the de-rating of the coupling effect of the pump or the coupling alone in fact has to be seen as the product of the outer de-rating factor and the inner de-rating factor.

In an embodiment the cooling of the magnets in the coupling can be done by the back iron structure or by specific cooling fins arranged on the back iron structure.

In an embodiment the inner rotor is free from permanent magnetic material.

In an embodiment the inner rotor is made of laminated steel plates, which are stacked.

In a preferred embodiment the rotor is made of a solid material, with ferritic properties. Such as a non-laminated material.

A solid rotor core will be prone to eddy currents, but as the system works as a magnetic coupling the magnetic field seen by the rotor is a stationary field. Whenever the coupling rotor is exposed to vibrations, on its shaft eddy currents will be generated and therefore the vibrations will be damped.

In an embodiment the area or space 140, 240 is filled with a non-magnetic material such as copper or stainless steel.

In a further embodiment the fillings are electrically connected in the both ends forming what is known from the field of electrical machines as a squirrel cage.

In an embodiment the area 140, 240 between each of the multiple projections 111, 211 of the inner rotor are filled with an electrical conducting and non-magnetic material, such as copper or aluminum, forming a plurality of elongated fillings, each of the elongated fillings are electrical connected to one another in both ends.

The advantage is that the fillings increase the torque of the coupling and thereby the efficiency.

The magnetic material used is mainly samarium-cobalt (Sm—Co), which can withstand very high temperatures. It is known to use the Sm—Co magnets in applications with high temperature fluids. The number of poles used in the present invention is relatively low, and preferably between 4 and 8. This should be seen in relation to the parts of the state of the art in which the number of poles between a driving permanent-magnetic rotor and a driven permanent magnet rotor can reach as much as 20. This is done to take advantage of magnetic material as much as possible.

In an embodiment the optimum number of magnetic poles are 4, 6 or 8, providing the best torque transfer between the two rotating parts. The rotor is formed as a star-like rotor having four arms that extend from the rotor center. Between the arms there is much empty space 140, 240, and it provides a good torque transmission by creating a big difference in the inductance of the soft magnetic arm and the empty spaces, and thereby generating reluctance.

In an embodiment the angles of the magnetization are derived by the following formular:

Mag_theta=(poles/2+1)*[round(magnets*theta/(2*pi))]*2*pi/magnets magnets (number of magnets)=24 poles (number of poles)=4 theta=$a \tan 2(y,x)$ where y,x are numbers between +1 and −1 as shown on the horizontal and vertical axes of the FIGS. 8a, 8b and 9 respectively.

In pump applications with a magnetic coupling, the motor and the fluid can be separated by a non-magnetizable rotor can 330 which eliminates the problem of sealing a rotating shaft. On this type of pump, the pump shaft 302 normally has a rotor with fixed magnets called the inner magnets. The motor shaft ends in a cup where the outer magnets are mounted on the inside of the cup. The rotor can is fixed in the pump housing between the pump shaft and the cup. The pump shaft and the motor shaft rotate, and the two parts are connected through the magnetic field. The main advantage of this design is that the pump is hermitically sealed.

In an embodiment, a rotor can is arranged between the inner rotor and the outer rotor, so to make a dividing section between the inner and outer rotor.

The rotor can is preferably made of a non-magnet material, such as plastic, ceramic or stainless steel. The reason for the non-magnetic material is that the rotor can is located in the magnetic air gap 150, 250, 650.

In an embodiment the rotor can comprises a temperature-insulated layer. This can be achieved by making the rotor can in a sandwich structure with an insulation layer, between a liquid tight layer(s), in fact only the surface being in direct contact with the liquid in the pump chamber needs to withstand the pressure of the liquid.

In an embodiment, a pump unit is arranged to pump a composition of high temperature heavy fuel oil. Heavy fuel oil has an extremely high viscosity at ambient temperature around 20 degrees Celsius, and thus it has to be heated up to 300-400 degrees Celsius in order to be pumped.

Therefore, it is important that the inner rotor is suitable for operating in a high temperature environment well above 300 degrees Celsius.

The pump unit or the coupling is made so the permanent magnets are attached to the cylindrical structure.

In an embodiment, the magnets are attached to the outer rotor structure by a temperature resistant adhesive glue.

As the most critical temperature is the Curie temperature of the magnets, the cured adhesive glue should be able to withstand a temperature higher than the Curie temperature of the magnets.

Common for the presented embodiments is that they all provide higher torque density. This benefit, in turn, relaxes requirements for supporting structures, power for drive motors, bearings, seals, lubricants, and cooling systems. These reduced requirements can have positive impact on performance, reliability, and periodic maintenance.

In summary the invention relates to a centrifugal pump comprising a magnetic coupling, wherein the magnetic coupling is mechanically connected to at least one impeller via an inner rotor, and where an outer rotor is connected to an electric motor arranged to produce a rotational torque, said pump being arranged to circulate a fluid by the at least one impeller. The magnetic coupling comprises: an outer rotor including a plurality of permanent magnets (101,201) arranged to form a plurality of magnetic poles, each magnetic pole having a plurality of sections; an inner rotor (110, 210) made of a magnetic susceptible material, wherein the inner rotor is formed with multiple radial projections (111, 211) acting as salient inner rotor poles distributed around an axis (130) of the inner rotor; the outer rotor and the inner rotor being located coaxially to one another around said axis (130, 230) and spaced apart from one another by an air gap (150,250). The outer rotor has a cylindrical structure surrounding (120, 220) the plurality of magnetic poles (105, 205), the cylindrical structure being made of a magnetic susceptible material for conducting a magnetic flux between the plurality of magnetic poles (105, 205), and each of the plurality of magnetic poles, comprises at least a section with a radial magnetic direction in respect of the axis and at least a section with a magnetic direction angled between a radial direction and a tangential direction in respect of the axis. The invention also relates to a coupling with the above mentioned features.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A pump unit (300) with at least one impeller (340), comprising a magnetic coupling (100, 200), wherein the coupling is mechanically connected to the at least one impeller via an inner rotor and where an outer rotor is connected to an electrical machine arranged to produce a rotational torque, said pump being arranged to circulate a fluid by the impeller, the magnetic coupling comprising
    an outer rotor including a plurality of permanent magnets (101,201) arranged to form a plurality of magnetic poles (105, 205);
    an inner rotor (110, 210);
    the outer rotor and the inner rotor being located coaxially to one another around an axis (130, 230) and spaced apart from one another by an air gap (150,250);
    a rotor can (330,662) arranged in the air gap (250, 150), between the inner rotor and the outer rotor, so to make a dividing section between the inner and outer rotor;
    the outer rotor has a cylindrical structure surrounding (120, 220) the plurality of magnetic poles (105, 205), the cylindrical structure being made of a magnetic susceptible material for conducting a magnetic flux between the plurality of magnetic poles (105, 205); and
    the inner rotor (110, 210) being made of a magnetic susceptible material and free of permanent magnetic material, wherein the inner rotor is formed with multiple radial projections (111, 210) acting as salient inner rotor poles distributed around the axis (130, 230) of the inner rotor;
characterized in that,
    each of the plurality of magnetic poles, comprising at least a section with a radial magnetic direction in respect of the axis (130, 230) and at least a section with a magnetic direction angled between a radial direction and a tangential direction in respect of the axis (130, 230),
    wherein the combined length of the sides of the plurality of permanent magnets cover less than 75% of the circumference of the cylindrical structure.

2. The pump unit according to claim 1, wherein at least some of the plurality of permanent magnets (101,102,104) are covered fully or partly with a thermal protection layer.

3. The pump unit according to claim 1, wherein the plurality of permanent magnets are magnetized with sinusoidal magnetization.

4. The pump unit according to claim 1, wherein each of the plurality of magnetic poles are arranged as a Halbach array.

5. The pump unit according to claim 1, wherein the direction angled between a radial and a tangential direction is with an angle in the range of 20 to 70 degrees in respect of the radial direction.

6. The pump unit according to claim 1, wherein the inner rotor is made of a non-laminated material.

7. The pump unit according to claim 1, wherein the inner rotor (660) is encircled by a rotor sleeve (661).

8. The pump unit according to claim 1, wherein the rotor can (662) comprises a temperature-insulating layer.

9. The pump unit according to claim 1 wherein the permanent magnets (101-104) are fixated fully or partly by supporting material (260) placed in between two neighboring magnets (605a, 605b) in a place where no permanent magnetic material is present.

10. The pump unit according to claim 9 wherein the supporting material (260) placed in between two neighboring magnets is made of an electrical conducting and non-magnetic material.

11. The pump unit according to claim 9 wherein the supporting material is made of a first layer (261) and a second layer (262), wherein the first layer (261) is made of an electrical conducting and non-magnetic material and the second layer (262) is made of a magnetic susceptible material.

12. The pump unit according to claim 1, wherein a space (140, 240) between each of the multiple projections (111, 210) of the inner rotor is filled with an electrical conducting and non-magnetic material forming a plurality elongated fillings, each of the elongated fillings are electrically connected to one another in both ends.

13. The pump unit according to claim 1, suitable for operating the inner rotor in a high temperature environment above 300 degrees Celsius and less than 500 degrees Celsius.

14. The pump unit according to 1, wherein the outer rotor comprises between two and eight magnetic poles, preferably four or six magnetic poles.

15. The pump unit according to 1 wherein the number of magnetic poles of the outer rotor is different from the number of salient inner rotor poles.

16. The pump unit according to claim 1 wherein the inner rotor has four radial projections (111), and where each projection has a length in radial direction that is longer than the width of the projection, and where each projection protrudes from the axis (130,230) in a direction towards the outer rotor and defines a mechanical angle of 90 degrees with each of two neighboring projections.

17. A magnetic coupling (100, 200) comprising
    an outer rotor including a plurality of permanent magnets, arranged to form a plurality of magnetic poles, each magnetic pole having a plurality of sections;
    an inner rotor made of a magnetic susceptible material and free of permanent magnetic material, wherein the inner rotor is formed with multiple radial projections acting as salient inner rotor poles distributed over a circumference of the inner rotor;
    the outer rotor (120,220) and the inner rotor (210, 110) being located coaxially to one another around an axis (230, 130) and spaced apart from one another by an air gap (250, 150);
    a rotor can (330, 662) arranged in the air gap (250, 150), between the inner rotor and the outer rotor, so to make a dividing section between the inner and outer rotor;
    the outer rotor has a cylindrical structure (120, 220) surrounding the plurality of magnetic poles, the cylindrical structure being made of a magnetic susceptible material for conducting a magnetic flux between the plurality of magnetic poles;

each of the plurality of sections, comprising at least a section (101, 201) with a radial magnetic direction in respect of the axis (130, 203) and at least a section (102, 202) with a magnetic direction angled between a radial direction and a tangential direction in respect of the axis (130, 203); and wherein the combined length of the sides of the plurality of permanent magnets cover less than 75% of the circumference of the cylindrical structure.

18. The pump unit according to claim 10 wherein the electrical conducting and non-magnetic material includes copper or aluminum.

19. The pump unit according to claim 12, wherein the electrical conducting and non-magnetic material includes copper or aluminum.

* * * * *